May 13, 1952  W. B. RODDENBERY, JR  2,596,602
MOLDING MACHINE
Filed May 17, 1948  5 Sheets-Sheet 1

INVENTOR.
W. B. Roddenbery, Jr.
BY Watson, Cole Grindle &
Watson,
ATTORNEYS

May 13, 1952 W. B. RODDENBERY, JR 2,596,602
MOLDING MACHINE
Filed May 17, 1948 5 Sheets-Sheet 2
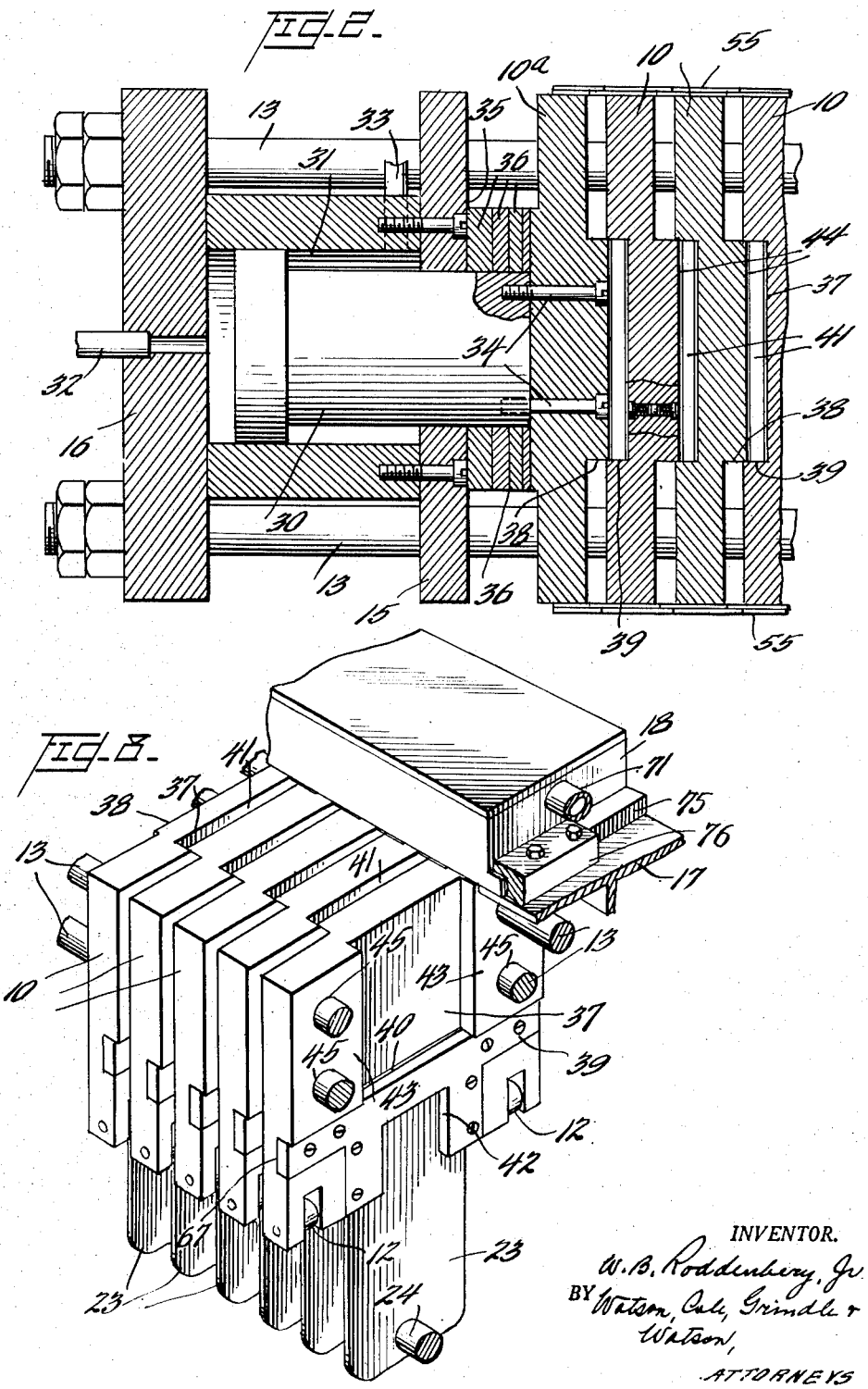
INVENTOR.
W. B. Roddenbery, Jr.
BY Watson, Cole, Grindle &
Watson,
ATTORNEYS May 13, 1952 W. B. RODDENBERY, JR 2,596,602
MOLDING MACHINE
Filed May 17, 1948 5 Sheets-Sheet 3
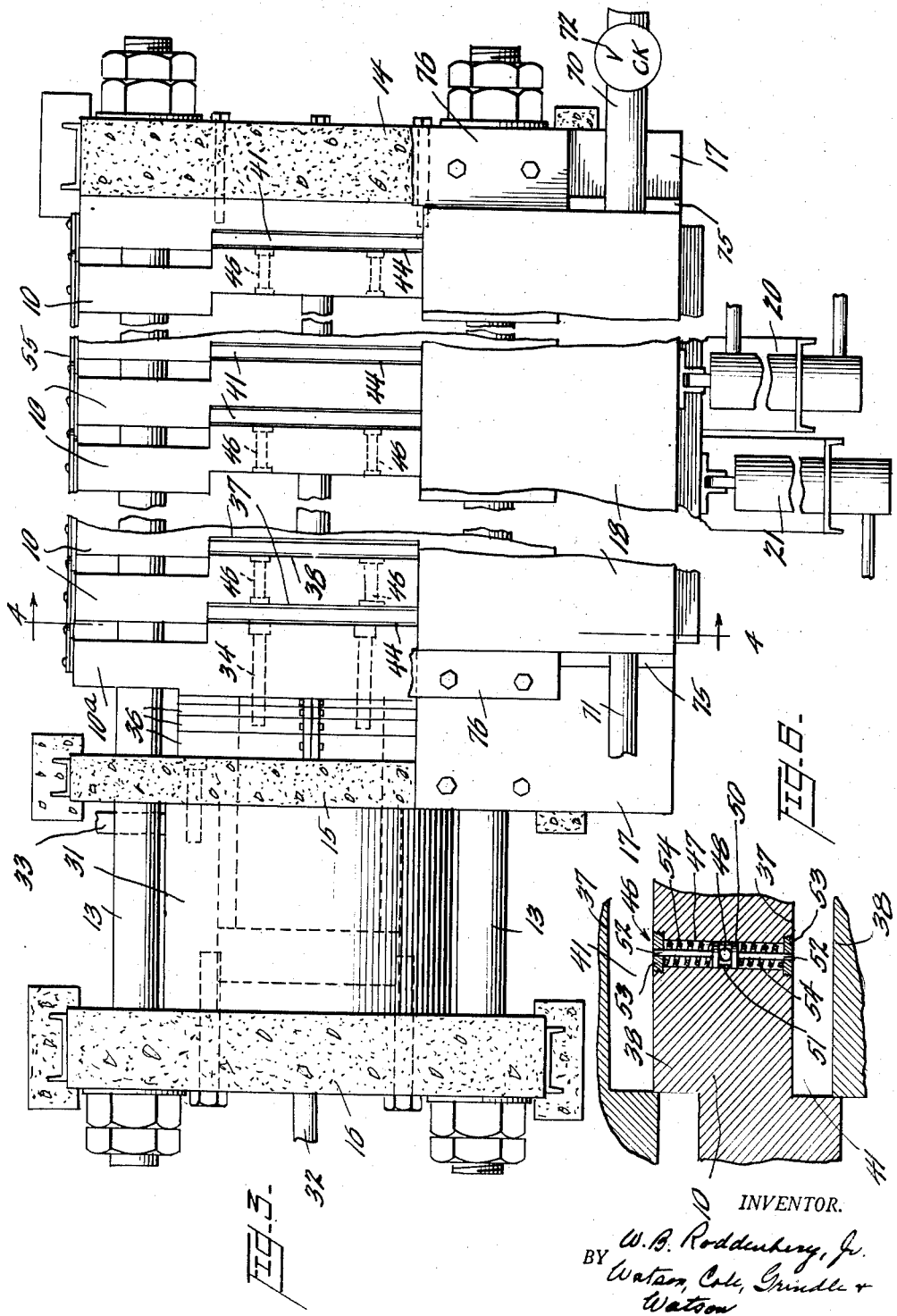
INVENTOR.
W. B. Roddenbery, Jr.
BY Watson, Cole, Grindle &
Watson,
ATTORNEYS May 13, 1952 W. B. RODDENBERY, JR 2,596,602
MOLDING MACHINE
Filed May 17, 1948 5 Sheets-Sheet 4
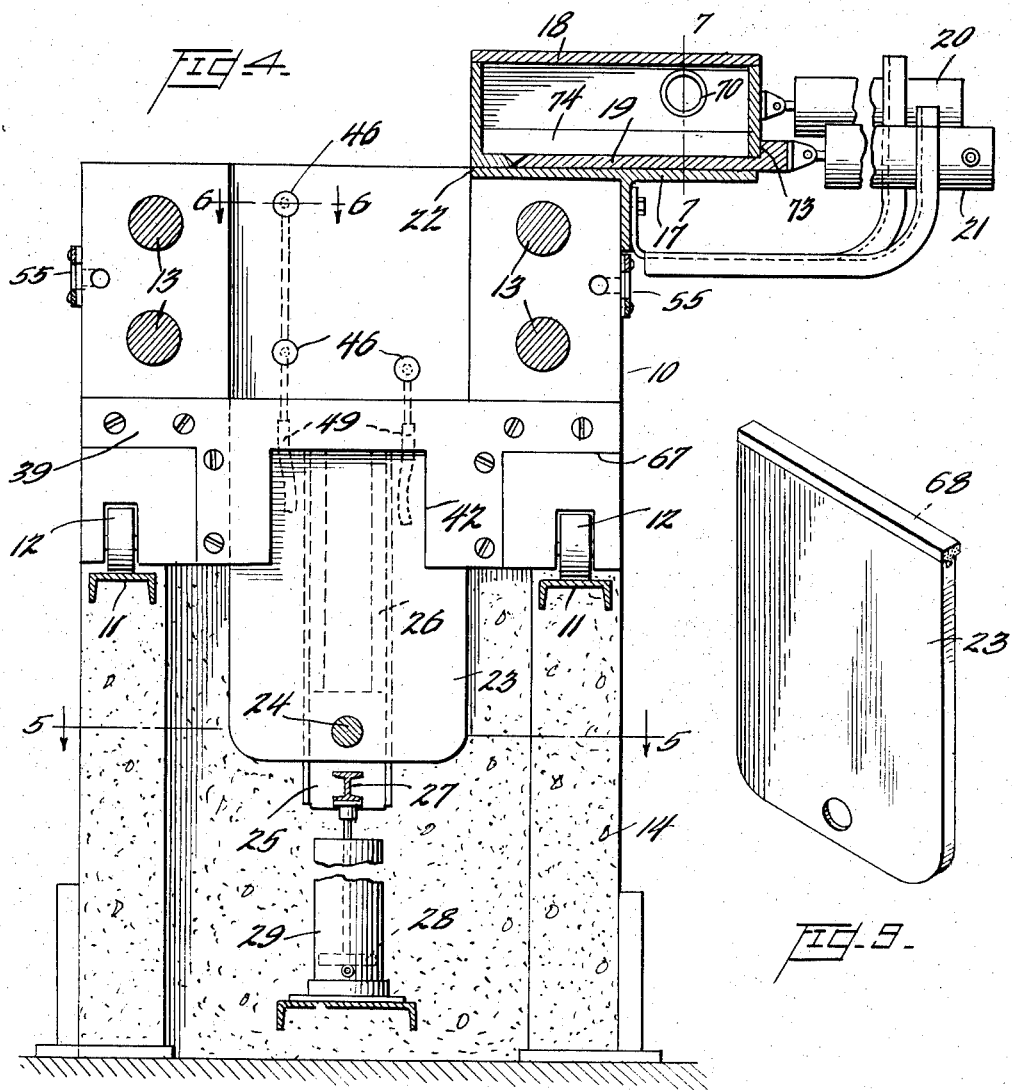
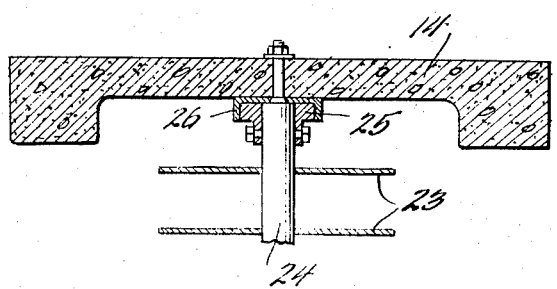
INVENTOR.
W. B. Roddenbery, Jr
BY Watson, Cole, Grindle
& Watson,
ATTORNEYS

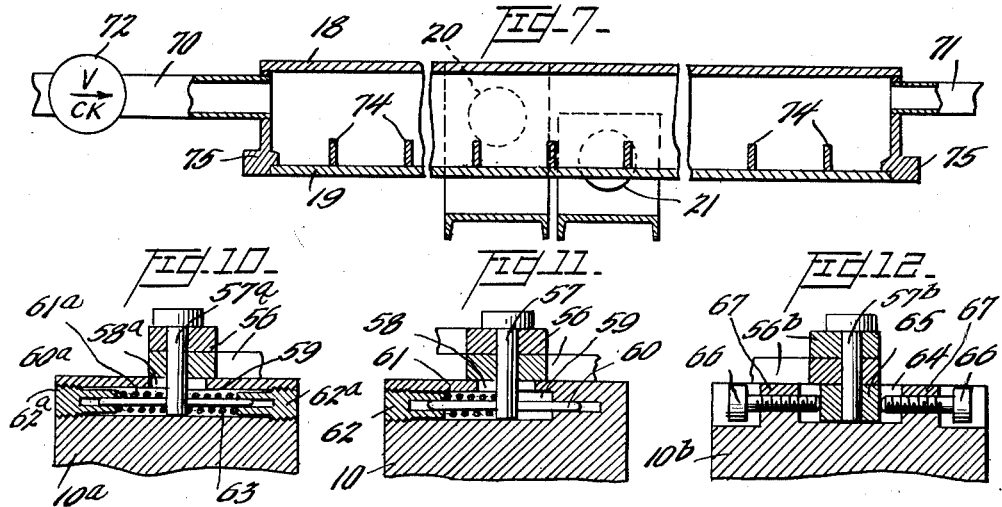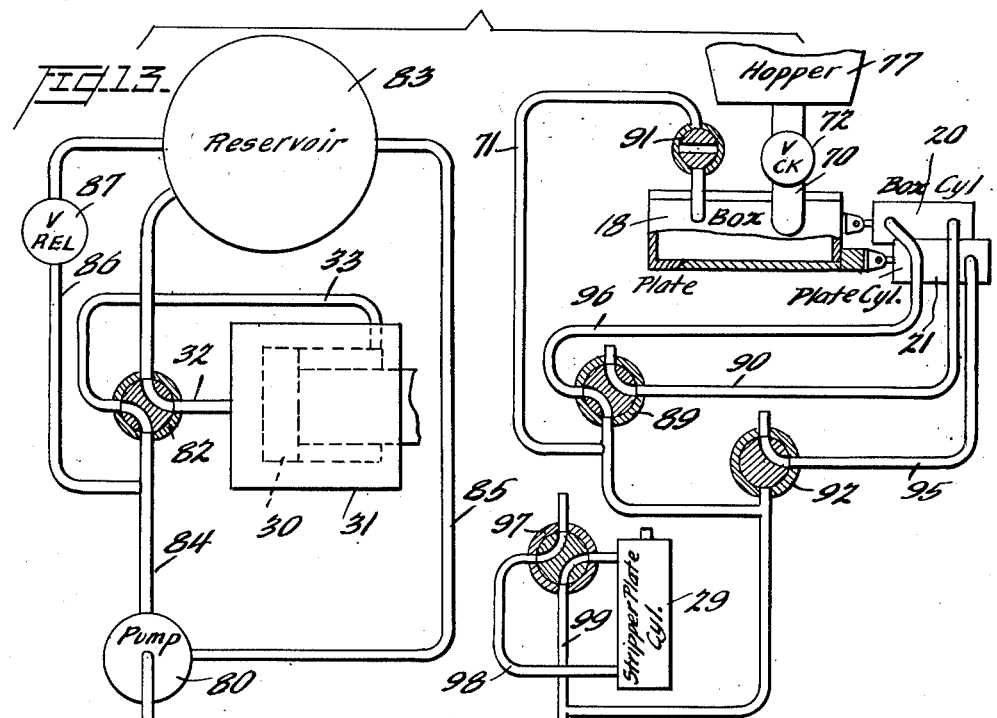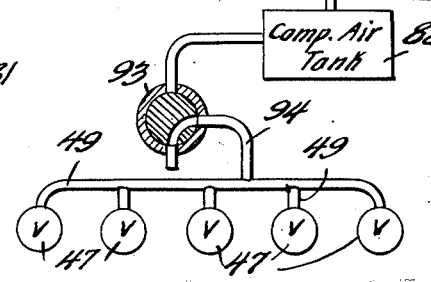

Patented May 13, 1952

2,596,602

UNITED STATES PATENT OFFICE 2,596,602

MOLDING MACHINE

Walter B. Roddenbery, Jr., Cairo, Ga.

Application May 17, 1948, Serial No. 27,541

18 Claims. (Cl. 25—42)

This invention relates to molding machines and more particularly to molding apparatus for the rapid production of slabs, tiles, shingles and like articles from mixtures of cement and asbestos fiber, cement and sand or any plastic material suitable for the manufacture of such articles.

Machines to be used in the rapid production of shingles or the like from plastic material by the application of pressure preferably comprise a plurality of molds arranged in series so that the molding pressure applied to the initial mold will be transmitted from mold to mold to compress the plastic material in each of the molds, thus forming a plurality of shingles in a single operation. This type of machine is preferable to that in which a plurality of molds are arranged in parallel, that is side-by-side, and compressed in a single operation, since for the series arrangement only sufficient pressure, neglecting friction, is necessary for the formation of a single shingle, whereas with a parallel arrangement it is necessary to increase the pressure by a multiple equal to the number of shingles being formed. It is, therefore, apparent that where a parallel arrangement is used as the number of molds is increased the mechanism for compressing the molds must of necessity become more bulky and expensive in order to provide the necessary pressure, whereas with a series arrangement it is only necessary to increase the length of the pressure stroke the instantaneous pressure required being constant except for the small increase necessary to overcome increased friction. Where a series arrangement of molds is used, however, many difficulties arise which are not necessarily encountered when using a parallel arrangement of molds. Thus strippers (which will be properly aligned with the molds) must be provided to remove the formed articles, likewise means for opening the molds equal amounts after the formed articles have been stripped from the molds and means for uniformly depositing and packing the plastic material to be molded in the molds must be provided. It is, therefore, an object of my invention is to provide a molding machine of the compression type wherein the molds are arranged in series and means are provided for uniformly charging the plastic material, and stripping and opening the molds.

It is further desired to provide means whereby holes or the like may be formed in the molded articles after the plastic material has been deposited in the molds so as to insure even distribution of the molded material around the openings thus formed.

In carrying out my invention, I employ a plurality of molds arranged in series and urged together by a single hydraulic piston. The molds are filled from a movable box-like container, the bottom of which fits the top of said molds and serves as a cover therefor during the compression stroke of the molding cycle. In order to remove the molded articles from the molds, individual strippers are provided, the strippers being adapted to move in unison during the stripping operation so as to complete the stripping of all the molds in one movement. Since it is necessary that each stripper be accurately aligned with its respective mold prior to the stripping operation, the strippers are carried by and are movable with the molds during the compression and return strokes of the machine.

In order to positively form nail holes or the like in the molded article, hydraulically operated plungers are provided in alternate molds the plungers being actuated during the molding cycle.

A pantograph linkage arrangement is provided to separate the individual molds in unison and by equal amounts on the return stroke of the compressing piston. In order to prevent damage to the pantograph system during the compression cycle of the molding operation, yielding connections are provided between the pantograph and the molds.

To provide thorough dispersion of the plastic material in the individual molds the material is deposited in the molds under air pressure, small openings being provided at the bottom of the molds to prevent the formation of air pockets which would inhibit proper dispersion.

The various units of the machine are preferably operated by fluid pressure, valves being provided for effecting their operation.

Other objects and advantages will become apparent upon a study of the following description of one embodiment of my invention in conjunction with the drawings.

Figure 2 is a top plan sectional view taken on line 2—2 of Figure 1 and showing the compression cylinder and piston together with some of the molds;

Figure 3 is a top plan view of Figure 1;

Figure 4 is a sectional end view taken on line 4—4 of Figure 3;

Figure 5 is a view taken on line 5—5 of Figure 4;

Figure 6 is a sectional view taken on line 6—6 of Figure 4 and showing in detail the means employed for forming holes in the molded articles;

Figure 1:
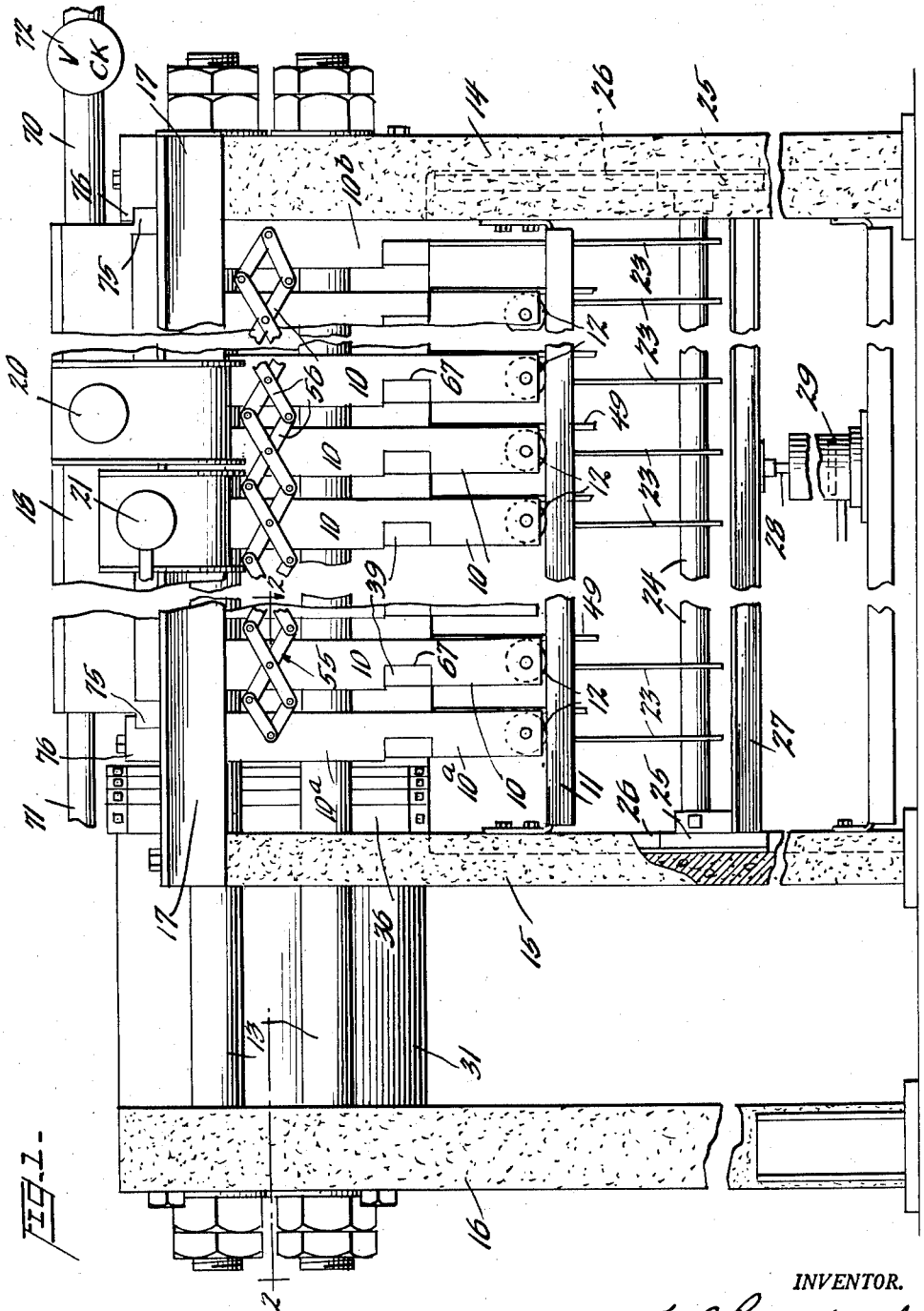
Figure 1 is a side elevation showing the end sections and a section near the center of my molding machine.

Figure 7 is a view taken along line 7—7 of Figure 4 giving a cross section view of the feed-box;

Figure 8 is a sectional perspective view showing the molds in open position with their associated stripper plates;

Figure 9 is a detail view of a stripper plate;

Figures 10, 11 and 12 show in detail the connection of the pantograph to the first mold, intermediate molds and the end or stationary mold; and Figure 13 is a schematic view of the hydraulic systems employed to operate the various movable parts of the molding machine.

The molding machine comprises generally a plurality of aligned molds formed from interengaging mold blocks 10 supported on track 11. The mold blocks are provided with wheels 12 and are guided and held in alignment with each other by engagement with cylindrical horizontally disposed shafts 13 along which they are adapted to slide. The shafts 13 together with the track 11 are supported by frame members 14 and 15 formed of reinforced concrete or other suitable building material. A third supporting frame member 16, through which the shafts also pass, together with frame member 15 serves to support the cylinder and piston by means of which the mold blocks 10 are moved.

A T-shaped supporting member 17 is provided on the upper edge of the molding machine for supporting a feed box 18 having a bottom 19, and their associated actuating piston cylinder assemblies 20 and 21. The ends of the T-shaped supporting member 17 rest on and are rigidly secured to the supporting walls 14 and 15. Referring to Figure 4 it will be noted that the mold blocks 10 are provided at their upper edges with a cutaway portion 22 slightly greater in depth than the thickness of the T support 17. This is to insure that the top surface of the T support 17 is substantially in the same plane as the tops of the molds and that a small space is provided between the bottom surface of the T support and the molds so that the feed box 18 and its bottom 19 may easily be slid over the molds for filling them and at the same time sufficient clearance be provided between the mold blocks 10 and the undersurface of the T support 17 so that the T support 17 will not interfere with the movement of the mold blocks.

A stripper plate 23 is provided for each mold to remove the shingle formed therein. The stripper plates 23 are loosely mounted on a common operating shaft 24, in order that the stripper plates may be moved in unison to remove formed shingles from the molds and at the same time may move relative to each other so as to stay in alignment with the respective molds. The shaft 24 has a shoe 25 rigidly secured to each end. These shoes are adapted to move in vertical guides 26 secured to the end walls 14 and 15 to prevent lateral movement of the shaft 24. Each of the shoes 25 is rigidly secured to one end of a cross beam 27 which in turn is connected to the piston 28 of a hydraulic motor 29 by means of which the stripper plates are actuated.

The mold blocks 10 are actuated by means of the movement of a piston 30 in a cylinder 31 through fluid pressure, the actuating fluid being admitted into the cylinder on the respective sides of the piston through pipes 32 and 33. One end of the piston 30 is rigidly secured to the first mold block 10a by means of bolts or the like 34.

Conventional spacing rings 36 are provided to insure correct spacing of the mold block 10a from the frame member 15, which member functions also as the head of the cylinder 31 and to prevent the base of the piston 30 from striking the end wall of the cylinder in the return stroke.

The molds are formed from individual mold blocks 10 each having a recessed portion 37 on one side and a piston or protruding section 38 on the other. The dimensions of the protruding section 38 and the recesses 37 are such that the protruding section of one mold block will closely fit and move into the recess of the adjacent mold block in much the same manner that a piston works in a cylinder.

On the recessed side of the mold block the recess is extended the vertical length of the block and a further transverse recess 67 is provided. A plate 39 having an indented portion or shallow recess 40, slightly wider than the thickness of one of the stripper plates 23, is secured into the recess 67 at the bottom of the mold block. The plate 39 forms the bottom of the mold cavity 41 and the recess or slot 40 in the plate 39 provides a space in which the stripper plate 23 can move. A strip 68 of rubber or like material is secured to the top edge of the stripper plate 23 in order to prevent leakage of material between the stripper plate 23 and the mold block 10 and plate 39 when the stripper plate 23 is in retracted position. A cutaway section 42 is provided in the bottom of the mold blocks 10 and plates 39 to permit the shaft 24, on which the stripper plates 23 are loosely mounted, to move up a sufficient distance to enable proper stripping of formed shingles from the mold cavities 41. Each of the mold blocks 10, with the exception of end block 10b, is provided with a pair of wheels 12 adapted to ride on tracks 11 to reduce friction and prevent deflection of shafts 13 due to the appreciable weight of mold blocks 10, when the mold blocks are moved toward or away from each other. Referring to Figure 8 it will be noted that the upper side portions 43 of the mold blocks are slightly thicker than the section including the plate 39. The reason for this is to provide a small opening 44 (see Figures 2 and 3) at the bottom of the mold cavities 41 when the mold blocks are in expanded position, the opening 44 permitting air and a small amount of material to escape when the molds are being filled.

In assembled position the mold blocks are aligned in series, the protruding section 38 of one extending into the cavity 37 of the adjacent mold block. The blocks are maintained in correct alignment with each other by means of the guide bars 13 which extend through holes 45 formed in the side sections 43 of the mold blocks. These holes should be of only slightly larger diameter than the rods 13 so as to prevent, as far as possible, any lateral or vertical movement of the mold blocks with respect to each other. However, the holes should be of sufficiently large diameter so as not to interfere with movement of the mold blocks 10 and 10a along the rods 13.

Heretofore, difficulty has been encountered in properly forming nail holes in the shingles during the molding process due to the fact that where fixed cores were used it was difficult to obtain an even distribution of the plastic material around the core. Therefore, means have been provided to form the nail holes positively during the molding operation. This is accomplished by providing in every other mold block a series of hydraulically operated nail hole formers 46 one of which is illustrated in detail in Figure 6. Referring to Figure 6 a bore 47 is provided, which passes through the mold and has an opening 48 near its center which communicates with a flexible conduit 49. Within the bore 47, disposed on either side of the opening 48, are two pistons 50 spaced from each other by a spacing ring 51. Each of the pistons is connected to a plunger or movable core 52, the diameter of which is the same as that of the desired nail hole. The ends of the plungers 52 pass through members 53 which serve to close the ends of the bore and act as guides for the plungers 52. The pistons 50 are continuously urged inwardly toward each other into their retracted position by means of compression springs 54. With this structure it is apparent that on admission of a fluid, such as air, under pressure through the fluid passage 49 to the center of bore 47 the pistons 50 and their associated plungers 52 will be forced outwardly against the pressure of springs 54 to form holes in the shingle material, shortly after the feed box bottom 19 has closed and during the compression stroke but before the material has been compressed into a compact hard state. The pressure in fluid passage 49 is sufficient to overcome opposite pressure of compression spring 54 and to force plungers 52 into the uncompressed material but it is only slightly greater so that during compression the mold block aided by the compression spring 54 will force plungers 52 and their pistons back somewhat into bore 47; the fluid pressure in passage 49, however, keeps the end of plunger 52 in contact with the mold blocks until the compression stroke is completed when pressure in fluid passage 49 is released by opening the valve which allows spring 54 to completely retract plunger 52 whereupon there is then no obstruction to stripping the compressed material.

It is seen that only a small pressure by the mold blocks is required to force the plunger into the bore 47 during the first part of the compression stroke, which pressure will not cause the plunger to bend but as the plunger is forced into the bore 47 further, more pressure from the mold block is required but the length of the plunger inserted into the material is shorter and is better able to withstand this pressure.

After the plastic material to be molded has been deposited in the molds, the molds are forced together by the piston 30 acting on mold block 10a which in turn, through the plastic material disposed between it and the next mold block, transmits the pressure to the next mold block and so on down the line until the plastic material in each mold has been sufficiently compressed. The last mold block 10b is rigidly secured to the supporting wall 14 and does not move. On the return stroke of the piston 30 only the initial mold block 10a would be moved. Provision is made, therefore, by means of a pantograph system 55 to transmit the return movement of the first mold block 10a to each of the other mold blocks 10 so that they, with the exception of end block 10b, will move an equal amount as each mold block relates to the adjacent mold block. That is, the distance between each mold block will be practically the same at any time during the return stroke and at end of return stroke. The mold cavities thus formed will all be substantially equal. The mold blocks do not move the same distances, respectively, but the spread between each pair of adjacent mold blocks is the same. If it were a six shingle machine the mold block 10a would actually move a distance six times as great as the last mold block which is adjacent to 10b.

In order not to damage the pantograph system 55 yielding connections are provided between the pantograph 55 and the respective mold blocks 10a and 10. For a detailed description of these connections reference is now made to Figures 10 through 12. The points of crossing of the pantograph links are connected to the respective mold blocks, the method of connection being the same for the intermediate mold blocks 10 and varying somewhat where the pantograph is attached to the end blocks 10a and 10b. Describing first the pantograph connection to the intermediate blocks 10 illustrated in Figure 11, the pantograph links 56 are pivotally secured to the block 10, at the point of crossing, by means of a pin 57. The pins 57 enter the mold blocks 10 through elongated slots 58 which communicate with bores or cavities 59 into which the end of the pins 57 pass and are secured by cotters 60. Relatively stiff compression springs 61 are placed in the bores 59 and held in position by a screw-threaded plug 62. The springs are of sufficient stiffness so as not to yield during the opening cycle of the molding operation when the blocks are urged toward the left, as viewed in Figure 11, by the pantograph linkage, but are of sufficient flexibility to yield during the compression cycle to compensate for difference in spacing between the molds. This is important since the density of the plastic mix is not always uniform and if some of the mold blocks obtain material between them of somewhat denser consistency than that between some of the other mold blocks the pantograph linkage would be damaged. However, with the provision of yielding connections as described, sufficient rigidity is obtained for the proper operation of the pantograph to open the molds and at the same time a yielding connection is provided to prevent damage during the compression cycle. The connection of the first mold block 10a to the movable end of the pantograph linkage is illustrated in detail in Figure 10. The pin 57a, spring 61a, and cotter 60a are for the same purpose as those described in Figure 11 for the intermediate mold blocks 10. An extra spring 63 somewhat stiffer than spring 61a is provided on the other side of pin 57 so as to provide a cushioned connection between the mold block 10a and the stationary end of the pantograph 55.

The stationary end of the pantograph is connected to the last mold block 10b as illustrated in Figure 12 so as to permit adjustment of the point of attachment. The mold block 10b is provided with a channel or slot 64 in which a block 65, which is attached to the end of pin 57b, is adapted to slide. The block is secured in the channel in any selected position by means of bolts 66 passing through threaded ridges 67 formed in the mold block 10b. It is apparent that the position of block 65 and pin 57b can be easily varied by means of the retaining bolts 66.

The feed box consists primarily of a box 18 and a bottom 19 each adapted to be moved over the molds by means of hydraulic motors 20 and 21, respectively. Plastic material, for example, a cement and asbestos fiber mixture, is fed into the box 18 through one or more conduits 70 from a mixing chamber or hopper 77. If more than one conduit 70 is used, they are equally spaced along the top of box 18 and each conduit will have its associated check valve. As box 18 and hopper 77 are relatively movable conduit 70 must be flexible, likewise conduit 71, hereinafter to be more particularly described.

When filling the molds the feed box 18 is moved by hydraulic motor 20 over the mold cavities 41 while the bottom 19 remains stationary. After the feed box 18 is completely over the molds, air under pressure is admitted into the box 18 through conduit 71 to pack the plastic material into the molds. The small opening 44 in the bottom of each mold cavity 41 permits air trapped in air pockets to escape from the molds thus assuring even distribution of plastic molding material throughout the molds. A check valve 72 is provided in the material feed line 70 to prevent the compressed air entering the box to escape through this path. After the plastic material in the molds has been subjected to the air pressure, the bottom 19 of the box is slid forward through operation of hydraulic motor 21, the box bottom 19 remaining in this position while the mold blocks are moved toward each other to perform the compression cycle of the molding operation. The feed box 18 and its bottom 19, due to the engagement of the feed box with shoulder 73 formed on the bottom 19, are then returned to their initial position through activation of hydraulic motor 20. The feed box 18 is provided with spaced horizontal webs 74 to prevent the bottom 19 from being forced up into the box by the plastic molding material during the molding operation, and in order to prevent upward movement of the box 18, flanges 75 are provided which move under fixed holddown or retaining members 76, two such members being provided, one for each flange 75, these members being rigidly mounted upon the frame of the machine. One end of each member is secured to support 17 and its other end to a rigid support (not illustrated) upon the opposite side of the machine.

In Figure 13 a hydraulic system for operating the molding machine has been shown schematically. As illustrated the valves are shown in a simple schematic form and are well spaced from each other to aid in the description. However, in actual application, all of the control valves will be located together so as to be easily accessible to the operator. It is also apparent that the valves can be combined or interlocked so as to produce the sequence of operations which will hereinafter be described.

As illustrated in Figure 13 the hydraulic operating system actually comprises two separate systems, one for operating the piston 30 for moving the mold blocks 10a and 10, and the other for operating the various other parts of the machine. This has been found advisable since the pressure for operating the piston 30 is of necessity considerably greater than that required for operating the rest of the machine. Therefore oil has been used as the operating fluid in the system requiring the greater pressure and air as the operating fluid in the other.

The system for operating piston 30 comprises a fluid pump 80, of any conventional type, driven by a motor 81. The exhaust or pressure side of pump 80 is connected through pipe 84 and valve 82 with either side of piston 30 through pipes 32 and 33. The valve 82 is constructed so as to connect one side of the piston 30 to a reservoir 83 to exhaust the fluid from that side of the piston when the other side of the piston is connected to the pressure side of pump 80, the inlet or suction side of the pump being connected with the reservoir by pipe 85.

In order to regulate the maximum amount of pressure built up in the molds a by-pass pipe 86, having a variable pressure release valve 87, is provided around valve 82.

In the air operated system all of the various hydraulic motors for driving the auxiliary parts of the molding machine are shown as being supplied from a single source of compressed air 88, the air being exhausted directly from the motors to the atmosphere on return movement of the pistons in said motors.

Having described the component parts of my molding machine, I will now describe one complete cycle of operation, referring to Figure 13 for a schematic illustration of the hydraulic systems used. In the drawings the various parts of my molding machine are shown in the positions they occupy at the beginning of a molding cycle.

In operation valve 89 is turned so as to permit air under pressure from compressed air tank 88 to enter cylinder 20 through pipe 90 to move the feed box 18 over the mold cavities 41. As the box 18 moves across the mold cavities plastic molding material is deposited therein from the box 18. After the feed box has completed its forward movement, it is in a position such that it completely covers all of the mold cavities 41. Valve 91 is now opened to permit air under pressure from tank 88 to enter feed box through conduit 71 in order to aid in the distribution of the plastic molding material in the molds. The molding material having been equally distributed in apertures by the air under pressure circulating through the fluffed material, valve 92 is turned so as to connect cylinder 21 through pipe 95 with the source of air pressure 88, so as to move bottom plate 19 forward to close feed box 18, valve 91 preferably being closed at the same time.

The mold cavities having been filled and the box 18 and bottom 19 being in their forward position so as to cover the mold cavities 41, valve 82 which controls the operation of piston 30, is now turned to connect the pressure side 84 of fluid pump 80 with conduit 32 so that oil from pump 80 is forced against the underside of piston 30 to move it forward and compress the material in the molds. Since relief valve 87 and pipe 86 provide a by-pass around valve 82 and cylinder 31, the maximum pressure to which the plastic molding composition is subjected can be controlled by adjustment of the relief valve 87. When the compression stroke is completed the pressure is held on the molds for about one-half second with asbestos cement mixtures.

The compression stroke having been completed, valve 82 is turned to the position shown in Figure 13, thus placing conduit 32 in communication with reservoir 83 and placing conduit 33 in communication with pressure line 84. The valve 82 is held in this position only long enough to release the pressure on the molds so that the formed articles may be stripped therefrom. After this time, the valve 82 is turned to its neutral position, all fluid flow then being through by-pass 86. Preferably, simultaneously with the operation of valve 82 to release pressure on the molds, valve 93 is turned to the position illustrated in Figure 13 so as to exhaust the air in cylinders 47 to the atmosphere thus permitting the springs 54 to retract the nail hole forming plungers 52.

Valves 89 and 92 controlling the operation of feed carriage 18 and bottom 19 are now turned to the positions shown in Figure 13. This connects the compressed air source 88 with the upper portion of cylinder 20 through pipe 96 and exhausts the lower portion of cylinder to the atmosphere through pipe 90 so as to cause the feed box to be returned to its initial starting position. Cylinder 21 also being exhausted to the atmosphere through pipe 95, the bottom 19 is also moved to its initial starting position due to the engagement of feed box 18 with the shoulder 73 thus uncovering the mold cavities 41.

The molds being uncovered, valve 97 is turned so as to connect pipe 98 leading from the bottom of cylinder 29 with the compressed air source 88 to raise shaft 24 and its associated stripper plates 23 so as to strip the formed shingles from the mold blocks. The shingles having been stripped from the mold blocks, they are removed, by any suitable means, and the valve 97 controlling piston 28 is turned so as to exhaust the lower portion of the cylinder 29 to the atmosphere and connect the upper portion through pipe 99 to the compressed air source 88 to cause downward movement of the piston 28 thus returning the stripper plates to their bottom position.

The stripper plates 23 having returned to their initial or bottom position, valve 82 is now turned again to the position occupied in Figure 13 to cause complete opening of the molds, all parts then being again in the positions shown in the drawings, a complete molding cycle having been completed. In actual operation, however, in order to save time, and prevent tunneling of material in apertures, valve 89 is turned to cause forward movement of the feed box 18 over the molds before the molds have been opened their full amount.

Having thus described the invention, what is claimed as new and desired to be secured by Letters Patent is:

1. In a molding machine a support, a plurality of interengaging mold blocks arranged in series on said support and adapted to be moved towards and away from each other to form a series of compression molds having open tops, a container for moldable material adapted to be moved over said openings for depositing said moldable material into said molds the bottom of said container forming a cover for said openings during the compression of said molds, means for moving said material container over said molds, operating means engaging the first mold block for moving said mold block towards said other mold blocks to compress said material into molded articles and away from said other mold blocks to open said molds, linkage means interconnecting said mold blocks to transmit substantially uniform opening movement from said first mold block to said other mold blocks so that said mold blocks will be separated substantially equal amounts at the end of said opening movement, power operated cores disposed within said mold blocks for forming openings in said molded articles, means for ejecting said cores from said mold blocks to penetrate said moldable material, and individual strippers provided for each of said molds, each of said strippers being continuously aligned with its respective mold, and means for simultaneously operating said strippers to eject the molded articles from said molds.

2. In a molding machine a support, a plurality of interengaging mold blocks arranged in series on said support and adapted to be moved towards and away from each other, said mold blocks forming a plurality of molds having openings at the top, a moldable material container adapted to be moved over said openings for depositing moldable material in said molds, the bottom of said container forming a cover for said openings during the compression of said molds, means for moving said material container over said openings, means for moving said mold blocks towards and away from each other to compress said material into molded articles, individual stripper means provided for each of said molds, each of said stripping means being continuously aligned with its respective mold, means for simultaneously operating said stripping means to eject the molded articles from said molds, said mold blocks being formed with a mold cavity on one side and a projection on the other, the projections and cavities of adjacent mold blocks being of such dimensions that the projection will closely fit the adjacent cavity but will easily move into the same to compress material deposited therein, and an opening formed at the bottom of each of said mold cavities through which said stripper is adapted to move to force molded articles from said mold cavity, said opening being of such dimensions with respect to said stripper that the stripper substantially fills said opening when in retracted position to prevent moldable material from escaping therethrough.

3. In a molding machine a support, a plurality of interengaging mold blocks arranged in series on said support and adapted to be moved towards and away from each other, said mold blocks forming a plurality of molds having openings at the top, a moldable material container adapted to be moved over said openings for depositing moldable material in said molds, the bottom of said container forming a cover for said openings during the compression of said molds, means for moving said material container over said openings, means for moving said mold blocks towards and away from each other to compress said material into molded articles, individual stripper means provided for each of said molds, each of said stripping means being continuously aligned with its respective mold, means for simultaneously operating said stripping means to eject the molded articles from said molds, said container comprising a closed box-like structure having a sliding bottom, a conduit communicating with said container for introducing molding material therein, a second conduit communicating with said container for introducing compressed air into said container, bracing means provided at the bottom of said container adapted to engage said bottom to prevent the same from being forced into said container, power means for moving said container over said molds for filling the same and for returning said container to its initial starting position, and power means for moving said bottom over said molds to cover the same said bottom being returned to its initial starting position together with said container by said first mentioned power means.

4. In a molding machine a support, a plurality of interengaging mold blocks arranged in series on said supports and adapted to be moved towards and away from each other to form a plurality of compression molds, means for depositing moldable material in said molds to fill the same, operating means to move said mold blocks towards each other to compress said material into molded articles, and means for stripping said molded articles from said molds comprising an individual stripper for each of said molds, each of said strippers being slidably secured to one of said mold blocks, a shaft extending longitudinally under said mold blocks and substantially parallel to the direction of movement of said mold blocks, said strippers being loosely mounted on said shaft so that they will move vertically with said shaft and may move relatively to each other along said shaft, and means for moving said shaft towards and away from said mold blocks to cause said strippers to move into molds to simultaneously eject said articles therefrom.

5. In a molding machine a support, a plurality of interengaging mold blocks the end one of which is stationary, said blocks being engaged in series on said support and adapted to be moved towards and away from each other to form a plurality of compression molds, means for depositing moldable material in said molds to fill the same, operating means engaging the first mold block for moving said mold block towards said other mold blocks to compress said material into molded articles and away from said other mold blocks to open said molds, linkage means interconnecting said mold blocks to transmit substantially uniform opening movement from said first mold block to said other mold blocks so that said mold blocks will be separated substantially equal amounts at the end of said opening movement, individual strippers provided for each of said molds each of said strippers being continuously aligned with its respective mold, means for simultaneously operating said strippers to eject the molded articles from said molds, said linkage means comprising a pantograph linkage system having a fixed end, a movable end, and a plurality of intermediate linkage points, means for securing said fixed end near the end mold block, means for resiliently securing said movable end to said first mold block, and means for resiliently securing said intermediate linkage points to said intermediate mold blocks to cause said mold blocks to move equal amounts on return movement of said first mold block, said resilient connections preventing damage to said linkage system due to unequal movement of said mold blocks on compression caused by differences in density of said deposited moldable material.

6. In a molding machine a support, a plurality of interengaging mold blocks arranged in series on said support and adapted to be moved towards and away from each other to form a series of compression molds each having a mold cavity, means for depositing moldable material in said mold cavities, means for moving said mold blocks towards and away from each other to compress said material into molded articles and means for forming openings in said articles during the molding operation comprising power operated cores disposed within said mold block and adapted to be ejected from said mold blocks to penetrate said moldable material, means for ejecting said cores, the means for forming openings in the molded articles comprising a cylinder formed within said mold block, a piston disposed in said cylinder, a plunger connected to said piston, means for introducing an actuating fluid under pressure into said cylinder to move said piston and associated plunger outwardly to project said plunger into said mold cavity, and resilient means disposed within said cylinder, said resilient means continuously urging said piston and associated plunger inwardly to maintain said plunger within said mold block when said piston is not subjected to the pressure of said actuating fluid.

7. In a molding machine a support, a plurality of interengaging mold blocks arranged in series on said support and adapted to be moved towards and away from each other to form a series of compression molds, hydraulic means for moving said mold blocks towards and away from each other, a source of hydraulic fluid under pressure for operating said hydraulic means, valve means for controlling the flow of said hydraulic fluid to said hydraulic means for controlling the operation of said compression molds, a feed box adapted to be moved over said molds for depositing moldable material therein, a slidable bottom arranged in said feed box said bottom serving as a cover for said molds, cores disposed within said mold blocks and adapted to be ejected therefrom to form openings in articles being molded, individual strippers for each of said molds for stripping formed articles therefrom, each of said strippers being continuously aligned with its respective mold, a stripper bar through which said strippers are simultaneously actuated said strippers being slidably secured to said stripper bar, said feed box, bottom, cores, and stripper bar each being actuated by separate hydraulic means, a source of fluid under pressure separate from said first mentioned source for operating said respective hydraulic means, and control valves interposed between said source of fluid under pressure and said hydraulic means for separately controlling the operation of said feed box, bottom, cores, and stripper bar.

8. Apparatus for simultaneously molding a plurality of articles comprising, in combination, a supporting frame, a plurality of mold-forming members disposed in series relation, each two adjacent members of said series together defining a molding chamber and a plurality of such molding chambers being provided by the series of members, each of said members being permanently associated with adjacent members, one surface of each of said members which bounds a molding chamber being formed with a recess, the other surface of each of said members which bounds a molding chamber being formed with a plunger-like portion fitting said recess in the opposite member and occupying at least a portion thereof at all times, the face of said plunger providing the opposite end wall of the molding chamber, fluid pressure means for effecting relative movement of said members upon said supporting frame so as to expand and contract said molding chambers, and fluid pressure means for effecting the discharge of molded articles from said chambers upon the completion of a molding operation.

9. Apparatus as set forth in claim 8 in which are provided reciprocatable core elements carried within recesses in certain of the walls of said chambers, fluid pressure means for projecting said cores into said chambers for forming openings through the material therein, and means for retracting said cores.

10. Apparatus as set forth in claim 8 in which are provided reciprocatable core elements carried within recesses in said mold forming members and projectable therefrom into said mold chambers in the direction of the expansion and contraction movement thereof, spring means urging said cores toward retracted position in said recesses, fluid pressure means for projecting said cores into said chambers to form openings in the articles therein, the opposite wall of the chamber which comprises the face of the next adjacent mold forming member adapted to abut said core when the molds are contracted, and the fluid pressure core projecting means adapted to yield to the pressure of said contraction.

11. Apparatus for simultaneously molding a plurality of articles comprising, in combination, a supporting frame, a plurality of mold forming members disposed in series relation, each two adjacent members of said series together defining a compression molding chamber and a plurality of such molding chambers being provided by the series of members, each of said members being permanently associated with adjacent members, one surface of each of said members which bounds a molding chamber being formed with a recess having an inner end wall, and being substantially closed around its periphery except upon one side which is normally open, the other surface of each of said members which bounds a molding chamber being formed with a plunger-like portion fitting said recess in the opposite member and occupying at least a portion thereof at all times, the face of said plunger providing the opposite end wall of the molding chamber, means for effecting relative movement of said members upon said supporting frame so as to expand and contract said molding chambers, means for closing said open side during the compression molding process, and means for effecting the discharge of molded articles through said open side from said chambers upon the completion of a molding operation.

12. Apparatus as set forth in claim 11 in which the article discharging means comprises individual ejector elements adapted to be projected through orifices in certain of the walls of the mold chambers into said chambers to contact the molded articles and eject them, a common elongated actuating member paralleling the series of mold members. extending in the general direction of relative movement of said members, and movable toward and from said mold members, connections between all of said ejector elements and said actuating member affording free relative movement longitudinally of said member, whereby said elements may automatically adjust themselves along said actuating member during relative movement of the mold members with which they are associated, and means for moving said actuating member to and from said molds for ejection and retraction.

13. Apparatus as set forth in claim 11 in which the article discharging means comprises individual ejector elements adapted to be projected through orifices in the bottom walls into said chambers to contact the molded articles and eject them through said open tops of the chambers, a common elongated actuating shaft parallelling the series of mold members, extending in the general direction of relative movement of said members, and movable toward and from said mold members, freely sliding connections between all of said ejector elements and said actuating shaft whereby said elements may automatically adjust themselves along said actuating shaft during relative movement of the mold members with which they are associated, and means for moving said actuating shaft to and from said molds for ejection and retraction.

14. Apparatus for simultaneously molding a plurality of articles comprising, in combination, a supporting frame, a plurality of mold forming members disposed in a horizontally aligned series on the frame, each two adjacent members of said series together defining a compression molding chamber and a plurality of such molding chambers being provided by the series of members, each of said members being permanently associated with adjacent members, one surface of each of said members which bounds a molding chamber being formed with a recess having an end wall, oppositely facing side walls, a bottom wall and a normally open top, the other surface of each of said members which bounds a molding chamber being formed with a plunger-like portion fitting said recess in the opposite member and occupying at least a portion thereof at all times, the face of said plunger providing the opposite end wall of the molding chamber, means for effecting relative movement of said members horizontally upon said supporting frame so as to expand and contract said molding chambers and compress the material therein, means for effecting the discharge of molded articles from said chambers through said open top upon the completion of a molding operation, and means for closing said open top during the molding and compression operation.

15. Apparatus for simultaneously molding a plurality of articles comprising, in combination, a supporting frame, a plurality of mold forming members disposed in a horizontally aligned series on said frame, each two adjacent members of said series together defining a compression molding chamber and a plurality of such molding chambers being provided by the series of members, each of said members being permanently associated with adjacent members, one surface of each of said members which bounds a molding chamber being formed with a recess having an end wall, opositely facing side walls, a bottom wall and a normally open top, the other surface of each of said members which bounds a molding chamber being formed with a plunger-like portion fitting said recess in the opposite member and occupying at least a portion thereof at all times, the face of said plunger providing the opposite end wall of the molding chamber, a charging container movable to and from a position over the open tops of said molding chambers for simultaneously charging them with material to be molded, said container closely fitting the open tops of the chambers and itself comprising an effective closure means therefor during the compression molding operation, means for moving said container, means for effecting relative movement of said members horizontally upon said supporting frame, so as to expand and contract said molding chambers, and means for effecting the discharge of molded articles from said chambers upon the completion of a molding operation.

16. In molding apparatus of the class described, a mold unit comprising a vertically disposed channel-shaped member, an element fixed to said first named member and bridging the channel of said member to define a slot therewith, a horizontally movable plunger member operable within the channel in the first named member and adapted to continuously engage the sides of said cavity, said members thus defining a compression molding chamber having an open top, an ejector element slidably disposed in the slot of said bottom forming element and adapted to close said slot during the molding operation, means for moving said ejector to discharge the formed article after said operation, and means for sealing the top opening of the chamber during the molding operation.

17. In molding apparatus of the class described, a mold unit comprising a channel-shaped member, an element fixed to said first named member and bridging the channel of said member to define a slot therewith, a plunger member operable within the channel in the first named member and adapted to continuously engage the sides of said cavity during the molding operation, said members thus defining a compression molding chamber having an open side, an ejector element slidably disposed in said slot and adapted to close one end of said slot during the molding operation, means for moving said ejector to discharge the formed article after said operation, and means for sealing the open side of the chamber during the molding operation.

18. In a cyclic molding apparatus for simultaneously molding a plurality of articles, in combination, a plurality of mold forming members disposed in series relation, each two adjacent members of said series defining together a molding chamber and a plurality of such molding chambers being provided by the series of members, each alternate one of said mold forming members being provided with recesses in opposite sides thereof, fluid pressure actuated core elements disposed in said recesses and projectable therefrom in opposite directions into the respective adjacent chambers to form holes in the articles being molded therein, controlled ducts in said members for transmitting actuating fluid to said recesses, and a source of pressure fluid for supplying said ducts.

WALTER B. RODDENBERY, JR.

REFERENCES CITED

The following references are of record in the file of this patent:

UNITED STATES PATENTS

| Number | Name | Date |
|---|---|---|
| 536,359 | Rittman | Mar. 26, 1895 |
| 869,692 | Daniel et al. | Oct. 29, 1907 |
| 965,027 | Shope | July 19, 1910 |
| 1,330,172 | Crozier | Feb. 10, 1920 |
| 1,429,459 | Schol | Sept. 19, 1922 |
| 1,749,375 | Dahl | Mar. 4, 1930 |
| 1,771,030 | Beals | July 22, 1930 |
| 1,800,849 | Stacy | Apr. 14, 1931 |
| 1,925,050 | Jagdmann et al. | Aug. 29, 1933 |
| 1,939,014 | Locher | Dec. 12, 1933 |
| 1,971,850 | Ernst | Aug. 28, 1934 |
| 2,059,387 | Nanfeldt | Nov. 3, 1936 |
| 2,169,281 | Pfanstiehl | Aug. 15, 1939 |
| 2,297,741 | Bruner | Oct. 6, 1942 |
| 2,394,260 | Pfeilsticker | Feb. 5, 1946 |

FOREIGN PATENTS

| Number | Country | Date |
|---|---|---|
| 207,674 | Great Britain | Dec. 6, 1923 |